United States Patent [19]

Evans et al.

[11] Patent Number: 5,784,619
[45] Date of Patent: Jul. 21, 1998

[54] REPLACEABLE AND EXTENSIBLE NOTEBOOK COMPONENT OF A NETWORK COMPONENT

[75] Inventors: John S. Evans, Mountain View; Michael A. Cleron; Stephen Fisher, both of Menlo Park; Patrick A. Holleran, Santa Cruz; Timo Bruck, Mountain View, all of Calif.

[73] Assignee: Apple Computer, Inc., Cupertino, Calif.

[21] Appl. No.: 947,778

[22] Filed: Oct. 9, 1997

Related U.S. Application Data

[63] Continuation of Ser. No. 435,374, May 5, 1995, abandoned.
[51] Int. Cl.$^6$ .................................................. G06F 15/163
[52] U.S. Cl. ...................... 395/682; 395/200.48; 345/356
[58] Field of Search ........................... 345/356; 395/682, 395/200.48, 200.47

[56] References Cited

U.S. PATENT DOCUMENTS

| | | | |
|---|---|---|---|
| 4,905,146 | 2/1990 | Barker et al. | 395/183.08 |
| 4,933,880 | 6/1990 | Borgendale et al. | 395/147 |
| 5,291,602 | 3/1994 | Baker et al. | 395/700 |
| 5,297,249 | 3/1994 | Bernstein et al. | 395/156 |
| 5,299,304 | 3/1994 | Williams et al. | 395/148 |
| 5,446,891 | 8/1995 | Kaplan et al. | 395/600 |
| 5,499,333 | 3/1996 | Doudnikoff et al. | 395/153 |
| 5,500,929 | 3/1996 | Dickinson | 395/160 |
| 5,511,160 | 4/1996 | Robson | 395/162 |
| 5,530,852 | 6/1996 | Meske, Jr. et al. | 395/600 |
| 5,572,643 | 11/1996 | Judson | 395/155 |

OTHER PUBLICATIONS

Develop, The Apple Technical Journal, "Building on OpenDoc Part Handler", Issue 19, Sep., 1994, pp. 6–16.

Primary Examiner—Robert B. Harrell
Assistant Examiner—Zarni Maung
Attorney, Agent, or Firm—Cesari and McKenna, LLP

[57] ABSTRACT

A notebook component of an extensible and replaceable network-oriented component system records locations of resources coupled to a computer network. The network-oriented system includes a novel application programming interface for the notebook component that facilitates integration with an underlying software component architecture. Such a highly-modular cooperating layered-arrangement between the network component system and the component architecture allows the notebook component to be replaced, extended or modified by other notebook-type components, while ensuring that these latter components "seamlessly" interact with existing components and component editors of the system.

20 Claims, 11 Drawing Sheets

REPLACEABLE AND EXTENSIBLE NOTEBOOK COMPONENT OF A NETWORK COMPONENT

This application is a continuation of application Ser. No. 08/435,374, filed on May 5, 1995, now abandoned.

CROSS-REFERENCE TO RELATED APPLICATIONS

This invention is related to the following copending U.S. patent applications:

U.S. patent application Ser. No. 08/435,377, titled EXTENSIBLE, REPLACEABLE NETWORK COMPONENT SYSTEM;

U.S. patent application Ser. No. 08/435,862, titled REPLACEABLE AND EXTENSIBLE LOG COMPONENT OF A NETWORK COMPONENT SYSTEM, now abandoned;

U.S. patent application Ser. No. 08/435,213, titled REPLACEABLE AND EXTENSIBLE CONNECTION DIALOG COMPONENT OF A NETWORK COMPONENT SYSTEM, now U.S. Pat. No. 5,724,506;

U.S. patent application Ser. No. 08/435,671, titled EMBEDDING INTERNET BROWSER/BUTTONS WITHIN COMPONENTS OF A NETWORK COMPONENT SYSTEM; and U.S. patent application Ser. No. 08/435,880, titled ENCAPSULATED NETWORK ENTITY REFERENCE OF A NETWORK COMPONENT SYSTEM, each of which was filed on May 5, 1995 and assigned to the assignee of the present invention.

FIELD OF THE INVENTION

This invention relates generally to computer networks and, more particularly, to an architecture and tools for building Internet-specific services.

BACKGROUND OF THE INVENTION

The Internet is a system of geographically distributed computer networks interconnected by computers executing networking protocols that allow users to interact and share information over the networks. Because of such wide-spread information sharing, the Internet has generally evolved into an "open" system for which developers can design software for performing specialized operations, or services, essentially without restriction. These services are typically implemented in accordance with a client/server architecture, wherein the clients, e.g., personal computers or workstations, are responsible for interacting with the users and the servers are computers configured to perform the services as directed by the clients.

Not surprisingly, each of the services available over the Internet is generally defined by its own networking protocol. A protocol is a set of rules governing the format and meaning of messages or "packets" exchanged over the networks. By implementing services in accordance with the protocols, computers cooperate to perform various operations, or similar operations in various ways, for users wishing to "interact" with the networks. The services typically range from browsing or searching for information having a particular data format using a particular protocol to actually acquiring information of a different format in accordance with a different protocol.

For example, the file transfer protocol (FTP) service facilitates the transfer and sharing of files across the Internet. The Telnet service allows users to log onto computers coupled to the networks, while the netnews protocol provides a bulletin-board service to its subscribers. Furthermore, the various data formats of the information available on the Internet include JPEG images, MPEG movies and µ-law sound files.

Two fashionable services for accessing information over the Internet are Gopher and the World-Wide Web ("Web"). Gopher consists of a series of Internet servers that provide a "list-oriented" interface to information available on the networks; the information is displayed as menu items in a hierarchical manner. Included in the hierarchy of menus are documents, which can be displayed or saved, and searchable indexes, which allow users to type keywords and perform searches.

Some of the menu items displayed by Gopher are links to information available on other servers located on the networks. In this case, the user is presented with a list of available information documents that can be opened. The opened documents may display additional lists or they may contain various data-types, such as pictures or text; occasionally, the opened documents may "transport" the user to another computer on the Internet.

The other popular information service on the Internet is the Web. Instead of providing a user with a hierarchical list-oriented view of information, the Web provides the user with a "linked-hypertext" view. Metaphorically, the Web perceives the Internet as a vast book of pages, each of which may contain pictures, text, sound, movies or various other types of data in the form of documents. Web documents are written in HyperText Markup Language (HTML) and Web servers transfer HTML documents to each other through the HyperText Transfer Protocol (HTTP).

The Web service is essentially a means for naming sources of information on the Internet. Armed with such a general naming convention that spans the entire network system, developers are able to build information servers that potentially any user can access. Accordingly, Gopher servers, HTTP servers, FTP servers, and E-mail servers have been developed for the Web. Moreover, the naming convention enables users to identify resources (such as directories and documents) on any of these servers connected to the Internet and allow access to those resources.

As an example, a user "traverses" the Web by following hot items of a page displayed on a graphical Web browser. These hot items are hypertext links whose presence are indicated on the page by visual cues, e.g., underlined words, icons or buttons. When a user follows a link (usually by clicking on the cue with a mouse), the browser displays the target pointed to by the link which, in some cases, may be another HTML document.

The Gopher and Web information services represent entirely different approaches to interacting with information on the Internet. One follows a list-approach to information that "looks" like a telephone directory service, while the other assumes a page-approach analogous to a tabloid newspaper. However, both of these approaches include applications for enabling users to browse information available on Internet servers. For example, TurboGopher is a text-based browser application for client computers operating in accordance with the Gopher protocol. Additionally, each of these applications has a unique way of viewing and accessing the information on server computers.

Typically, a computer includes an operating system and application software which, collectively, control the operations of the computer. The applications are preferably task-specific and independent, e.g., a word processor application edits text, a drawing application edits drawings and a database application interacts with information stored on a database storage unit. Although a user can move data from one application to the other, such as by copying a drawing into a word processing file, the independent applications must be invoked to thereafter manipulate that data. This is primarily because the applications are designed as monolithic, autonomous modules that generally do not interact efficiently.

Netscape Navigator™ ("Netscape") is an example of a monolithic Web browser application that is configured to interact with many of the previously-described protocols, including HTTP, Gopher and FTP. However when instructed to invoke an application that uses one of these protocols, Netscape "translates" the protocol to hypertext. Such awkward translation places the user farther away from the protocol designed to run the application and, in some cases, actually thwarts the user's Internet experience. For example, a discussion system requiring an interactive exchange between participants may be bogged down by hypertext translations.

Each of these information services provides a mechanism for retaining designated network locations that may be of interest to a user; in Netscape, the mechanism is a hot list and in TurboGopher, it is a bookmark. These location retaining mechanisms, however, are not generally configured to interact with applications other than their own, primarily due to the monolithic nature of the Netscape and TurboGopher applications. Thus, it is difficult to replace the hot list and bookmark by similar mechanisms provided by other developers; furthermore, the monolithic nature of the applications generally precludes extension of the functions and behaviours of these mechanisms other than by those developers associated with the respective services.

The Gopher and Web services may further require additional applications to perform specific functions, such as playing sound or viewing movies, with respect to the data types contained in the documents. For example, Netscape employs helper applications for executing application programs having data formats it does not "understand". Execution of these functions on a computer requires interruption of processing and context switching (i.e., saving of state) prior to invoking the appropriate application. Thus, if a user operating within the Netscape application "opens" a MPEG movie, that browsing application must be saved (e.g., to disk) prior to opening an appropriate MPEG application, e.g., Sparkle, to view the image. Such an arrangement is inefficient and rather disruptive to execution of the application programs.

Generally, the application program presents information to a user through a window of a graphical user interface by drawing images, graphics or text within the window region. The user, in turn, communicates with the application by "pointing" at graphical objects in the window with a pointer that is controlled by a hand-operated pointing device, such as a mouse, or by pressing keys of a keyboard.

The graphical objects typically included with each window region are sizing boxes, buttons and scroll bars. These objects represent user interface elements that the user can point at with the pointer (or a cursor) to select or manipulate. For example, the user may manipulate these elements to move the windows around on the display screen, and change their sizes and appearances so as to arrange the window in a convenient manner. When the elements are selected or manipulated, the underlying application program is informed, via the window environment, that control has been appropriated by the user.

A menu bar is a further example of a user interface element that provides a list of menus available to a user. Each menu, in turn, provides a list of command options that can be selected merely by pointing to them with the mouse-controlled pointer. That is, the commands may be issued by actuating the mouse to move the pointer onto or near the command selection, and pressing and quickly releasing, i.e., "clicking" a button on the mouse.

Command options in the menus typically act on one or more objects. If an application requires more information to carry out a command, a dialog box may be employed. A dialog box is a special type of window that elicits information from the user, such as requiring the user to check items or fill in the blanks, typically through the use of a graphical object that the user can manipulate with the mouse. Such an object is called a control and, by manipulating the control, the user can take an immediate action or change a setting to modify a future action. A modal dialog box requires that the user respond to the elicitation prior to performing other actions.

In contrast to this typical application-based computing environment, a software component architecture provides a modular document-based computing arrangement using tools such as viewing editors. The key to document-based computing is the compound document, i.e., a document composed of many different types of data sharing the same file. The types of data contained in a compound document may range from text, tables and graphics to video and sound. Several editors, each designed to handle a particular data type or format, can work on the contents of the document at the same time, unlike the application-based computing environment.

Since many editors may work together on the same document, the compound document is apportioned into individual modules of content for manipulation by the editors. The compound-nature of the document is realized by embedding these modules within each other to create a document having a mixture of data types. The software component architecture provides the foundation for assembling documents of differing contents and the present invention is directed to a system for extending this capability to network-oriented services.

Therefore, it is among the objects of the present invention to simplify a user's experience on computer networks without sacrificing the flexibility afforded the user by employing existing protocols and data types available on those networks.

Another object of the invention is to provide a system for users to search and access information on the Internet without extensive understanding or knowledge of the underlying protocols and data formats needed to access that information.

Still another object of the invention is to provide a document-based computing system that enables users to replace and extend modules configured to provide services directed to information available on computer networks.

SUMMARY OF THE INVENTION

Briefly, the invention comprises a notebook component of an extensible and replaceable network-oriented component system for recording a location of a resource coupled to a computer network. The location is recorded as an item in the notebook component, which is preferably a compound document stored on the user's computer. The notebook and items are typically represented by visual objects, e.g., icons, that can be manipulated to display their contents on a computer screen. That is, the notebook may be opened to display a list of its items and an item may be opened to display the contents of the referenced resource.

In accordance with the invention, the network-oriented system includes a novel application programming interface (API) for the notebook component that facilitates integration with an underlying software component architecture. Such a highly-modular cooperating layered-arrangement between the network component system and the component architecture allows the notebook component to be replaced, extended or modified by other notebook-type components, while ensuring that these latter components "seamlessly" interact with existing components and component editors of the system.

Furthermore, the API allows other service developers to insert items into the notebook components without affecting operation of the novel network component system. For example, a user operating within a Gopher service in accordance with a Gopher browser may record a particular location in Gopher space by instructing the browser (via a menu item specifying "add to notebook") to store the location as an item in the notebook.

In the illustrative embodiment, the notebook component and items are objects of the network-oriented component system that is preferably embodied as a customized framework having a set of interconnected abstract classes. Specifically, a CyberNotebookExtension class defines a notebook component object for storing item objects constructed from a CyberItem class. Each item object contains an address pointer, e.g., a uniform resource locator (URL), for referencing any resource resident on the computer networks. In response to a user double-clicking on its associated icon, the item examines its URL and proceeds to "open" and display the resource as a document.

Advantageously, the notebook component provides a location within a computer where users can store references to places on computer networks which they have "visited" and found interesting. As described herein, the references are stored as items represented by icons that a user may double-click on to "return" to the interesting places.

Another advantage of the invention involves the component approach to network navigation tools; any service having a corresponding component adapted to the network-oriented component system can utilize the notebook for recording network locations. Moreover, the notebook component may be efficiently extended, replaced and modified within the network component system. Although monolithic application programs such as Netscape and TurboGopher have functional equivalents to the novel notebook, i.e., tools for recording locations of network resources, each of these applications' notebook is solely their own and, thus, cannot be replaced or extended or modified.

BRIEF DESCRIPTION OF THE DRAWINGS

The above and further advantages of the invention may be better understood by referring to the following description in conjunction with the accompanying drawings in which.

DETAILED DESCRIPTION OF ILLUSTRATIVE EMBODIMENT

Figure 1:
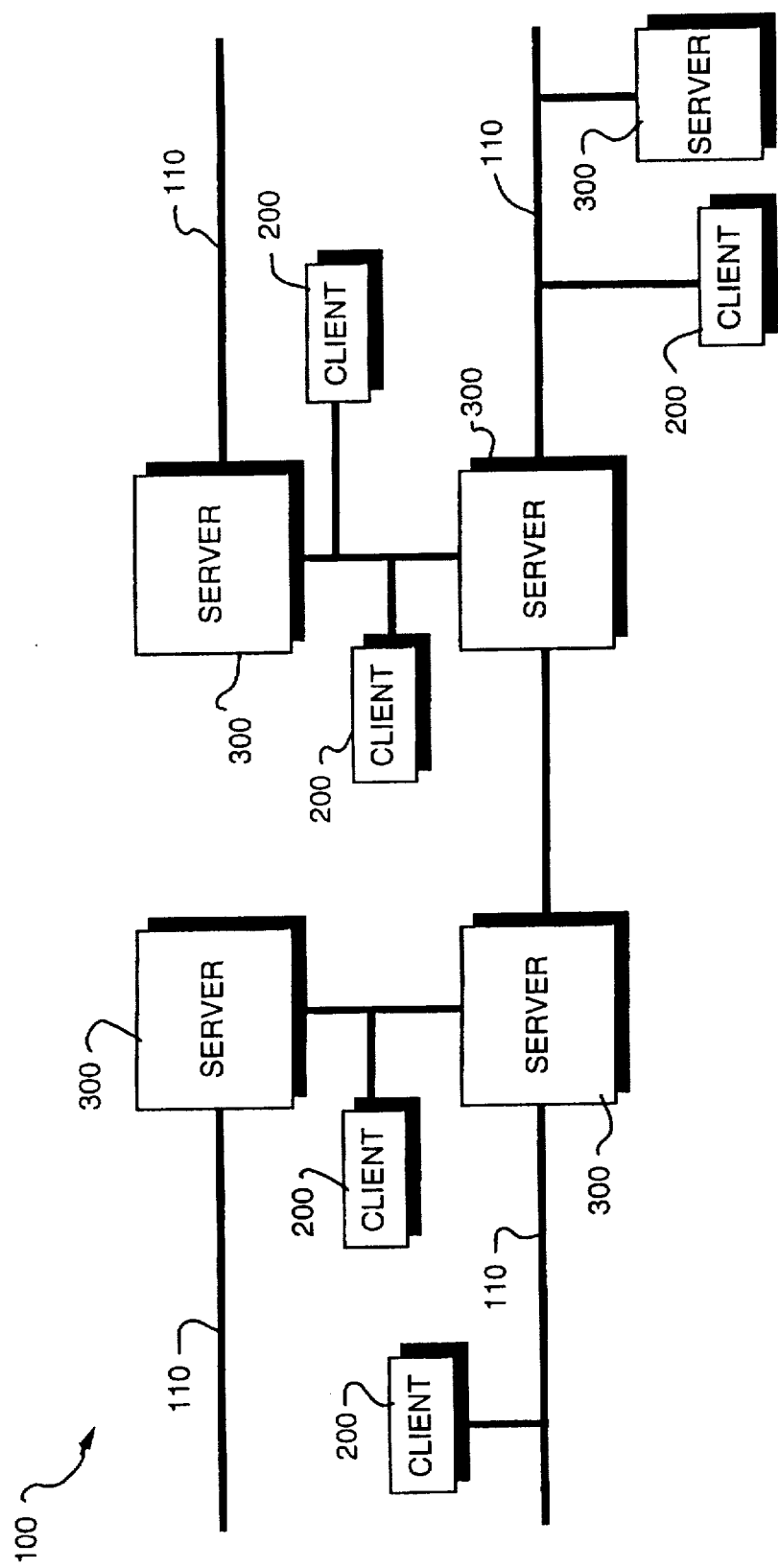
FIG. 1 is a block diagram of a network system including a collection of computer networks interconnected by client and server computers.

FIG. 1 is a block diagram of a network system 100 comprising a collection of computer networks 110 interconnected by client computers ("clients") 200, e.g., workstations or personal computers, and server computers ("servers") 300. The servers are typically computers having hardware and software elements that provide resources or services for use by the clients 200 to increase the efficiency of their operations. It will be understood by those skilled in the art that, in an alternate embodiment, the client and server may exist on the same computer; however, for the illustrative embodiment described herein, the client and server are separate computers.

Several types of computer networks 110, including local area networks (LANs) and wide area networks (WANs), may be employed in the system 100. A LAN is a limited area network that typically consists of a transmission medium, such as coaxial cable or twisted pair, while a WAN may be a public or private telecommunications facility that interconnects computers widely dispersed. In the illustrative embodiment, the network system 100 is the Internet system of geographically distributed computer networks.

Computers coupled to the Internet typically communicate by exchanging discrete packets of information according to predefined networking protocols. Execution of these networking protocols allow users to interact and share information across the networks. As an illustration, in response to a user's request for a particular service, the client 200 sends an appropriate information packet to the server 300, which performs the service and returns a result back to the client 200.

Figure 2:
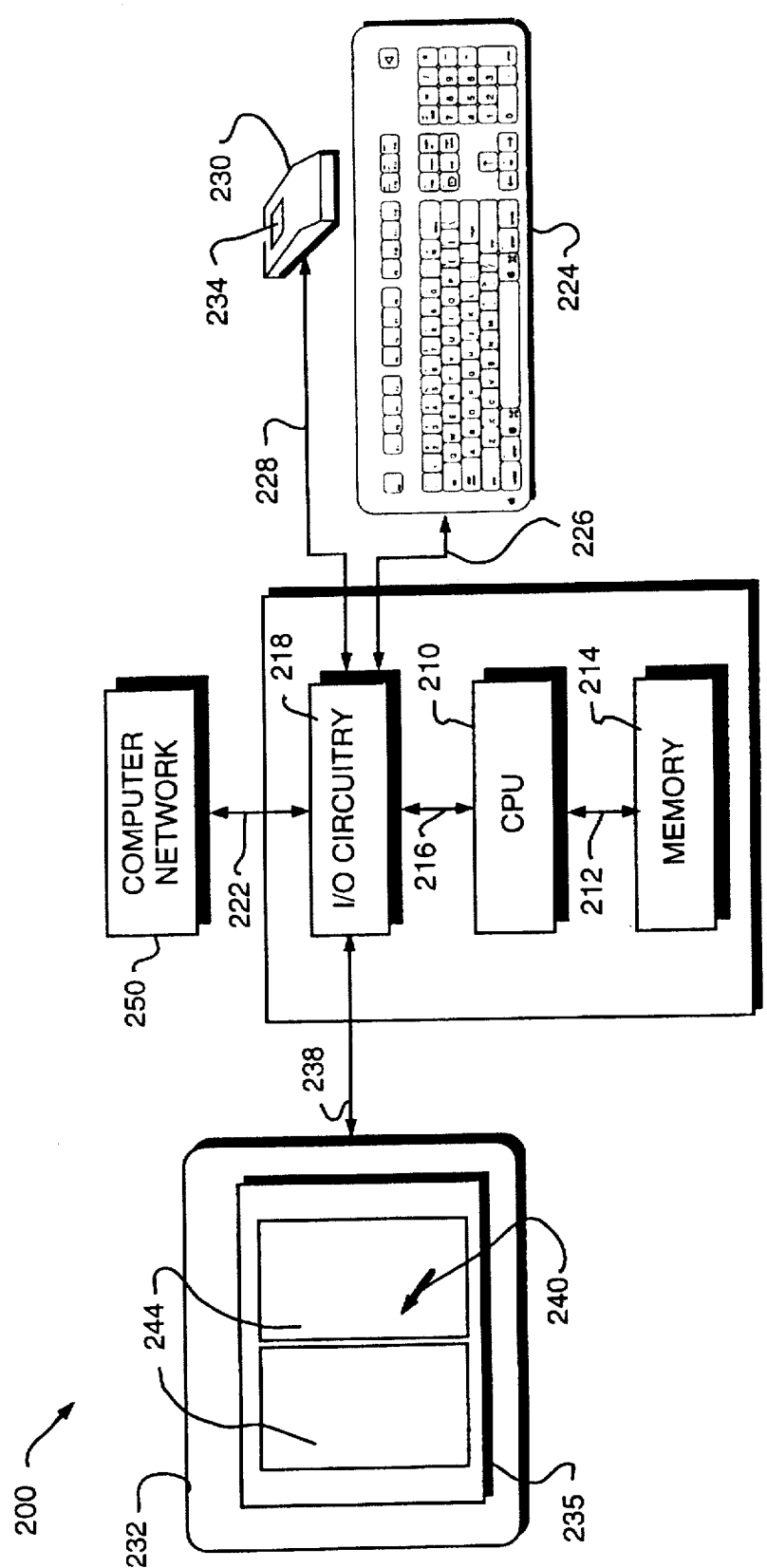
FIG. 2 is a block diagram of a client computer, such as a personal computer, on which the invention may advantageously operate.

FIG. 2 illustrates a typical hardware configuration of a client 200 comprising a central processing unit (CPU) 210 coupled between a memory 214 and input/output (I/O) circuitry 218 by bidirectional buses 212 and 216. The memory 214 typically comprises random access memory (RAM) for temporary storage of information and read only memory (ROM) for permanent storage of the computer's configuration and basic operating commands, such as portions of an operating system (not shown). As described further herein, the operating system controls the operations of the CPU 210 and client computer 200.

The I/O circuitry 218, in turn, connects the computer to computer networks, such as the Internet computer networks 250, via a bidirectional bus 222 and to cursor/pointer control devices, such as a keyboard 224 (via cable 226) and a mouse 230 (via cable 228). The mouse 230 typically contains at least one button 234 operated by a user of the computer. A conventional display monitor 232 having a display screen 235 is also connected to I/O circuitry 218 via cable 238. A pointer (cursor) 240 is displayed on windows 244 of the screen 235 and its position is controllable via the mouse 230 or the keyboard 224, as is well-known. Typically, the I/O circuitry 218 receives information, such as control and data signals, from the mouse 230 and keyboard 224, and provides that information to the CPU 210 for display on the screen 235 or, as described further herein, for transfer over the Internet 250.

Figure 3:
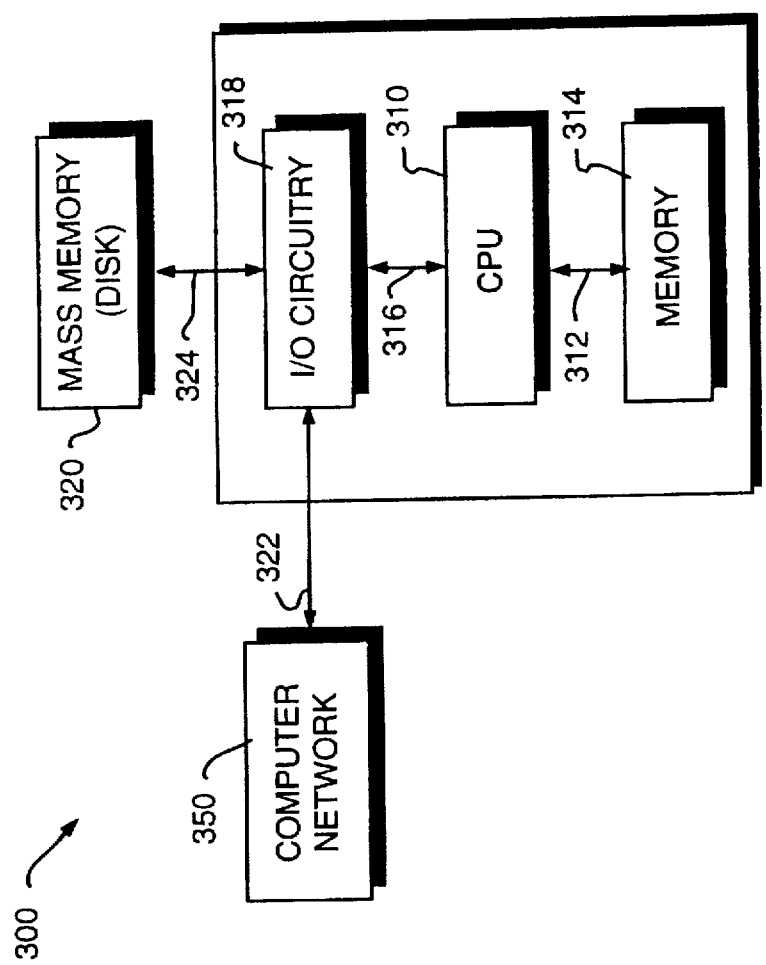
FIG. 3 is a block diagram of a server computer of FIG. 1.

FIG. 3 illustrates a typical hardware configuration of a server 300 of the network system 100. The server 300 has many of the same units as employed in the client 200, including a CPU 310, a memory 314, and I/O circuitry 318, each of which are interconnected by bidirectional buses 312 and 316. Also, the I/O circuitry connects the computer to computer networks 350 via a bidirectional bus 322. These units are configured to perform functions similar to those provided by their corresponding units in the computer 200. In addition, the server typically includes a mass storage unit 320, such as a disk drive, connected to the I/O circuitry 318 via bidirectional bus 324.

It is to be understood that the I/O circuits within the computers 200 and 300 contain the necessary hardware, e.g., buffers and adapters, needed to interface with the control devices, the display monitor, the mass storage unit and the networks. Moreover, the operating system includes the necessary software drivers to control, e.g., network adapters within the I/O circuits when performing I/O operations, such as the transfer of data packets between the client 200 and server 300.

The computers are preferably personal computers of the Macintosh® series of computers sold by Apple Computer Inc., although the invention may also be practiced in the context of other types of computers, including the IBM® series of computers sold by International Business Machines Corp. These computers have resident thereon, and are controlled and coordinated by, operating system software, such as the Apple® System 7®, IBM OS2®, or the Microsoft® Windows® operating systems.

Figure 4:
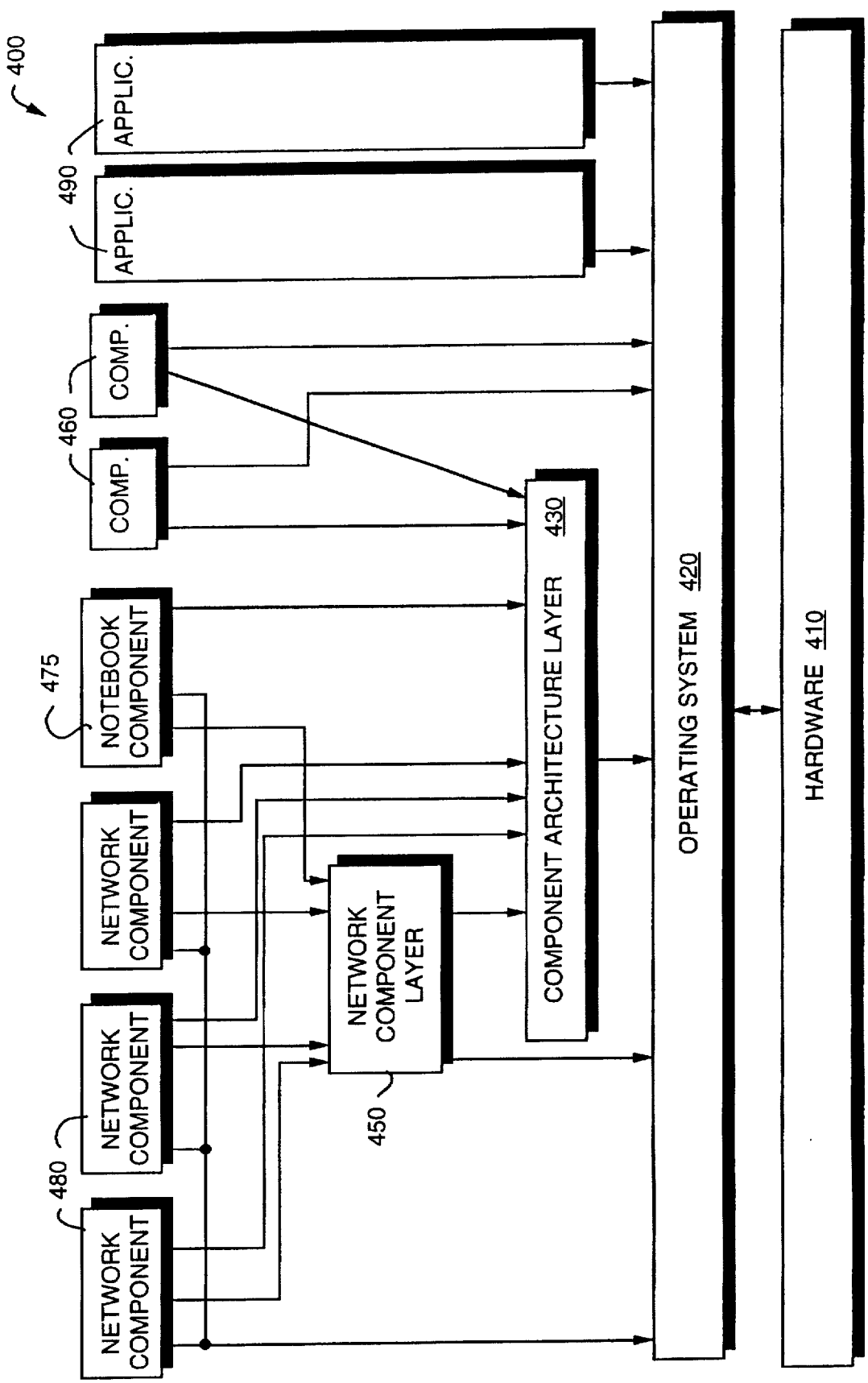
FIG. 4 is a highly schematized block diagram of a layered component computing arrangement in accordance with the invention.

As noted, the present invention is based on a modular document computing arrangement as provided by an underlying software component architecture, rather than the typical application-based environment of prior computing systems. FIG. 4 is a highly schematized diagram of the hardware and software elements of a layered component computing arrangement 400 that includes the novel network-oriented component system of the invention. At the lowest level there is the computer hardware, shown as layer 410. Interfacing with the hardware is a conventional operating system layer 420 that includes a window manager, a graphic system, a file system and network-specific interfacing, such as a TCP/IP protocol stack and an Appletalk protocol stack.

The software component architecture is preferably implemented as a component architecture layer 430. Although it is shown as overlaying the operating system 420, the component architecture layer 430 is actually independent of the operating system and, more precisely, resides side-by-side with the operating system. This relationship allows the component architecture to exist on multiple platforms that employ different operating systems.

In accordance with the present invention, a novel network-oriented component layer 450 contains the underlying technology for implementing the extensible and replaceable network component system having a notebook component 475 that stores locations of resources coupled to computer networks, such as the Internet. As described further herein, this technology includes a novel application programming interfaces (API) that facilitates integration with the underlying component architecture layer 430 and allows the notebook component to be replaced, extended or modified by other notebook-type components. The novel API is preferably delivered in the form of objects in a class hierarchy.

It should be noted that the network component layer 450 may operate with any existing system-wide component architecture, such as the Object Linking and Embedding (OLE) architecture developed by the Microsoft Corporation; however, in the illustrative embodiment, the component architecture is preferably OpenDoc, the vendor-neutral, open standard for compound documents developed by, among others, Apple Computer, Inc.

Figure 5:
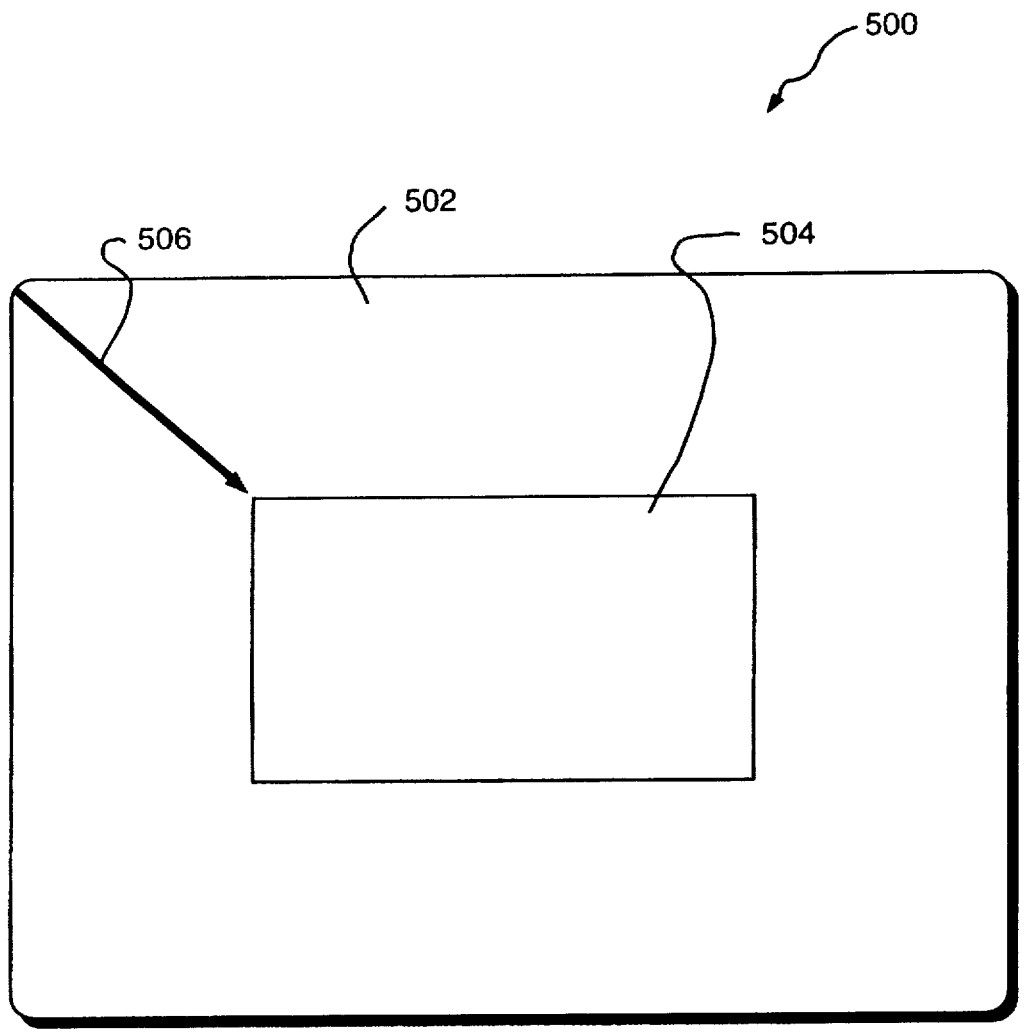
FIG. 5 is an illustration of basic primitives for defining the layout of a compound document.

Using tools such as viewing editors, the component architecture layer 430 creates a compound document composed of data having different types and formats. Each differing data type and format is contained in a fundamental unit called a computing part or, more generally, a "component" 460 comprised of a viewing editor along with the data content. An example of the computing component 460 may include a MacDraw component. The component editor, on the other hand, is analogous to an application program in a conventional computer. That is, the editor is a software component which provides the necessary functionality to display a component's contents and, where appropriate, present a user interface for modifying those contents. Additionally, the editor may include menus, controls and other user interface elements. An internal layout element of the component architecture layer 430 is used to organize these contents of a compound document and, further, to distinguish boundaries between editors. The layout element, in turn, comprises three data structures which form primitives for defining the layout of such a document. Referring to FIG. 5, these structures include a canvas, a frame and a transformation.

Specifically, the canvas 502 is a data structure which represents the overall context of the document. It includes a description of coordinate space and a mechanism for capturing a series of graphical commands into an image or representation. Examples of canvasses are a bit or pixel map on a computer screen, a page description language for a printer and a display list for a computer display. The frame 504, on the other hand, is a data structure which serves as a shared information repository between a "container" component and an embedding component.

A transformation is a data structure which represents a set of geometric descriptions that are applied to graphical commands. In the example of FIG. 5, the transformation is depicted as an offset 506 from a reference point, e.g., the upper left-hand corner of the canvas 502. Other types of transformations include scaling, rotation, skews and distortions. In general, the transformation is a geometric description of the location and orientation of the frame 504 on the canvas 502. Preferably, this description can be two-dimensional or three-dimensional in nature.

Referring again to FIG. 4, the network component layer 450 extends the functionality of the underlying component architecture layer 430 by defining key integrating network-oriented components 480, such as the notebook component. As noted, a feature of the invention is the ability to easily extend, replace or modify the notebook component of the layered computing arrangement 400 with a different notebook-type component to provide a user with a customized network-related service offering. This feature is made possible by the cooperating relationship between the, network component layer 450 and its underlying component architecture layer 430. The integrating components communicate and interact with these various components of the system in a "seamlessly integrated" manner to provide basic tools for navigating the Internet computer networks.

FIG. 4 also illustrates the relationship of applications 490 to the elements of the layered computing arrangement 400. Although they reside in the same "user space" as the components 460 and network components 480, the applications 490 do not interact with these elements and, thus, interface directly to the operating system layer 420. Because they are designed as monolithic, autonomous modules, applications (such as previous Internet browsers) often do not even interact among themselves. In contrast, the components of the arrangement 400 are designed to work together via the common component architecture layer 430 or, in the case of the network components, via the novel network component layer 450.

Specifically, the invention features the provision of the extensible and replaceable network-oriented component system which, when invoked, causes actions to take place that enhance the ability of a user to interact with the computer to obtain information available over computer networks such as the Internet. The information is manifested to a user via a window environment, such as the graphical user interface provided by System 7 or Windows, that is preferably displayed on the screen 235 (FIG. 2) as a graphical display to facilitate interactions between the user and the computer, such as the client 200. This behavior of the system is brought about by the interaction of the network components with a series of system software routines associated with the operating system 420. These system routines, in turn, interact with the component architecture layer 430 to create the windows and graphical user interface elements, as described further herein.

The window environment is generally part of the operating system software 420 that includes a collection of utility programs for controlling the operation of the computer 200. The operating system, in turn, interacts with the components to provide higher level functionality, including a direct interface with the user. A component makes use of operating system functions by issuing a series of task commands to the operating system via the network component layer 450 or, as is typically the case, through the component architecture layer 430. The operating system 420 then performs the requested task. For example, the component may request that a software driver of the operating system initiate transfer of a data packet over the networks 250 or that the operating system display certain information on a window for presentation to the user.

Figure 6:
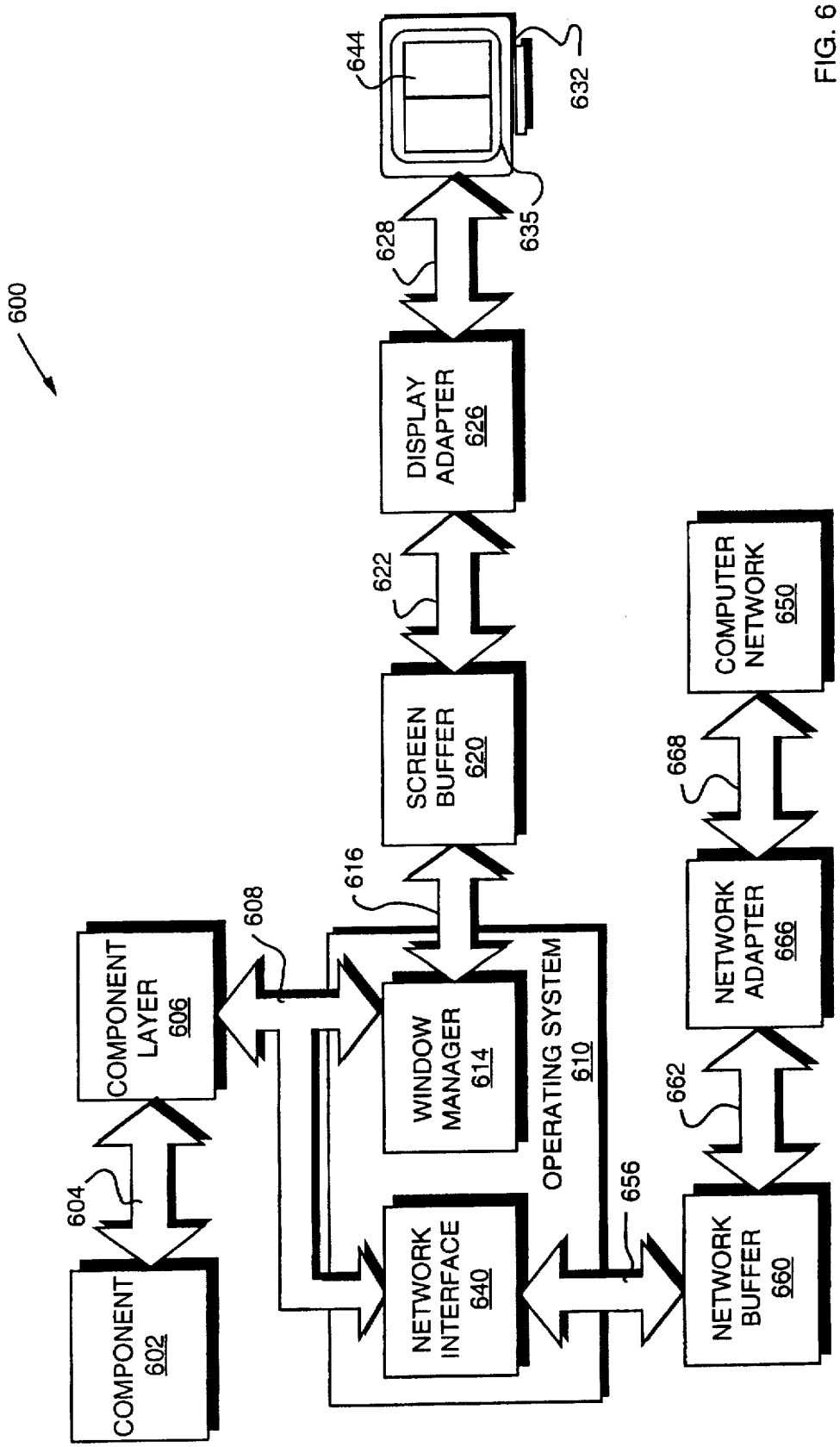
FIG. 6 is a schematic illustration of the interaction of a component, a software component layer and an operating system of the computer of FIG. 2.

FIG. 6 is a schematic illustration of the interaction of a component 602, software component layer 606 and an operating system 610 of a computer 600, which is similar to, and has equivalent elements of, the client computer 200 of FIG. 2. As noted, the network component layer 450 (FIG. 4) is integrated with the component architecture layer 430 to provide a cooperating architecture that allows the novel notebook component to be replaced, extended or modified by other notebook-type components; accordingly, for purposes of the present discussion, the layers 430 and 450 may be treated as a single software component layer 606.

The component 602, component layer 606 and operating system 610 interact to control and coordinate the operations of the computer 600 and their interaction is illustrated schematically by arrows 604 and 608. In order to display information on a screen display 635, the component 602 and component layer 606 cooperate to generate and send display commands to a window manager 614 of the operating system 610. The window manager 614 stores information directly (via arrow 616) into a screen buffer 620.

The window manager 614 is a system software routine that is generally responsible for managing windows 644 that the user views during operation of the network component system. That is, it is generally the task of the window manager to keep track of the location and size of the window and window areas which must be drawn and redrawn in connection with the network component system of the present invention.

Under control of various hardware and software in the system, the contents of the screen buffer 620 are read out of the buffer and provided, as indicated schematically by arrow 622, to a display adapter 626. The display adapter contains hardware and software (sometimes in the form of firmware) which converts the information in the screen buffer 620 to a form which can be used to drive a display screen 635 of a monitor 632. The monitor 632 is connected to display adapter 626 by cable 628.

Similarly, in order to transfer information as a packet over the computer networks, the component 602 and component layer 606 cooperate to generate and send network commands, such as remote procedure calls, to a network-specific interface 640 of the operating system 610. The network interface comprises system software routines, such as "stub" procedure software and protocol stacks, that are generally responsible for formatting the information into a predetermined packet format according to the specific network protocol used, e.g., TCP/IP or Apple-talk protocol.

Specifically, the network interface 640 stores the packet directly (via arrow 656) into a network buffer 660. Under control of the hardware and software in the system, the contents of the network buffer 660 are provided, as indicated schematically by arrow 662, to a network adapter 666. The network adapter incorporates the software and hardware, i.e., electrical and mechanical interchange circuits and characteristics, needed to interface with the particular computer networks 650. The adapter 666 is connected to the computer networks 650 by cable 668.

In a preferred embodiment, the invention described herein is implemented in an object-oriented programming (OOP) language, such as C++, using System Object Model (SOM) technology and OOP techniques. The C++ and SOM languages are well-known and many articles and texts are available which describe the languages in detail. In addition, C++ and SOM compilers are commercially available from several vendors. Accordingly, for reasons of brevity, the details of the C++ and SOM languages and the operations of their compilers will not be discussed further in detail herein.

As will be understood by those skilled in the art, OOP techniques involve the definition, creation, use and destruction of "objects". These objects are software entities comprising data elements and routines, or functions, which manipulate the data elements. The data and related functions are treated by the software as an entity that can be created, used and deleted as if it were a single item. Together, the data and functions enable objects to model virtually any real-world entity in terms of its characteristics, which can be represented by the data elements, and its behavior, which can be represented by its data manipulation functions. In this way, objects can model concrete things like computers, while also modeling abstract concepts like numbers or geometrical designs.

Objects are defined by creating "classes" which are not objects themselves, but which act as templates that instruct the compiler how to construct an actual object. A class may, for example, specify the number and type of data variables and the steps involved in the functions which manipulate the data. An object is actually created in the program by means of is a special function called a "constructor" which uses the corresponding class definition and additional information, such as arguments provided during object creation, to construct the object. Likewise objects are destroyed by a special function called a "destructor". Objects may be used by manipulating their data and invoking their functions.

The principle benefits of OOP techniques arise out of three basic principles: encapsulation, polymorphism and inheritance. Specifically, objects can be designed to hide, or encapsulate, all, or a portion of, its internal data structure and internal functions. More specifically, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions that have the same overall format, but that work with different data, to function differently in order to produce consistent results. Inheritance, on the other hand, allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these functions appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Figure 7:
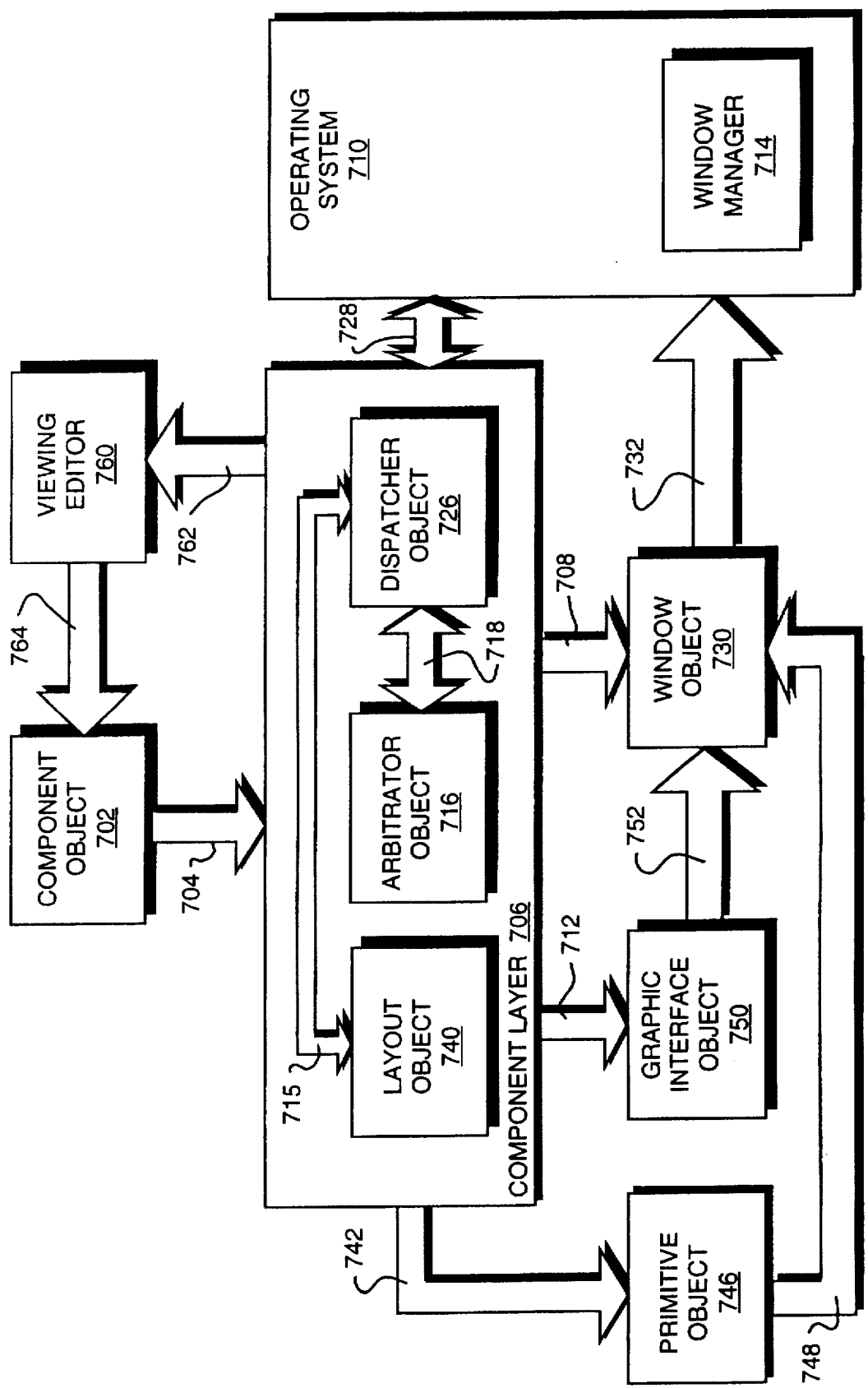
FIG. 7 is a schematic illustration of the interaction between a component, a component layer and a window manager in accordance with the invention.

In accordance with the present invention, the component 602 and windows 644 are "objects" created by the component layer 606 and the window manager 614, respectively, the latter of which may be an object-oriented program. Interaction between a component, component layer and a window manager is illustrated in greater detail in FIG. 7.

In general, the component layer 706 interfaces with the window manager 714 by creating and manipulating objects. The window manager itself may be an object which is created when the operating system is started. Specifically, the component layer creates window objects 730 that cause the window manager to create associated windows on the display screen. This is shown schematically by an arrow 708. In addition, the component layer 706 creates individual graphic interface objects 750 that are stored in each window object 730, as shown schematically by arrows 712 and 752. Since many graphic interface objects may be created in order to display many interface elements on the display screen, the window object 730 communicates with the window manager by means of a sequence of drawing commands issued from the window object to the window manager 714, as illustrated by arrow 732.

As noted, the component layer 706 functions to embed components within one another to form a compound document having mixed data types and formats. Many different viewing editors may work together to display, or modify, the data contents of the document. In order to organize the contents of the document and distinguish boundaries between the editors, the component layer 706 includes an internal layout element 740. The layout element is an object that comprises data structures such as a canvas, a frame and a transformation, each of which form primitive objects 746 for defining the layout of the document. These primitive objects are also stored in each window object 730, as shown schematically by arrows 742 and 748.

Moreover, in order to direct keystrokes and mouse events initiated by a user to the proper components and editors, the component layer 706 includes an arbitrator 716 and a dispatcher 726. The dispatcher is an object that communicates with the operating system 710 to identify the correct viewing editor 760, while the arbitrator is an object that informs the dispatcher as to which editor "owns" the stream of keystrokes or mouse events. Specifically, the dispatcher 726 receives these "human-interface" events from the operating system 710 (as shown schematically by arrow 728), and communicates with the arbitrator and layout objects (as shown schematically by arrows 718 and 715) to deliver the events to the correct viewing editor 760 via arrow 762. The viewing editor 760 then modifies or displays, either visually or acoustically, the contents of the data types.

Although OOP offers significant improvements over other programming concepts, software development still requires significant outlays of time and effort, especially if no pre-existing software is available for modification. Consequently, a prior art approach has been to provide a developer with a set of predefined, interconnected classes which create a set of objects and additional miscellaneous routines that are all directed to performing commonly-encountered tasks in a particular environment. Such predefined classes and libraries are typically called "frameworks" and essentially provide a pre-fabricated structure for a working document.

For example, a framework for a user interface might provide a set of predefined graphic interface objects which create windows, scroll bars, menus, etc. and provide the support and "default" behavior for these interface objects. Since frameworks are based on object-oriented techniques, the predefined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of that original program. In addition, developers are not blindly working through layers of code because the framework provides architectural guidance and modeling and, at the same time, frees the developers to supply specific actions unique to the problem domain.

There are many kinds of frameworks available, depending on the level of the system involved and the kind of problem to be solved. The types of frameworks range from high-level frameworks that assist in developing a user interface, to lower-level frameworks that provide basic system software services such as communications, printing, file systems support, graphics, etc. Commercial examples of application-type frameworks include MacApp (Apple), Bedrock (Symantec), OWL (Borland), NeXT Step App Kit (NeXT) and Smalltalk-80 MVC (ParcPlace).

While the framework approach utilizes all the principles of encapsulation, polymorphism, and inheritance in the object layer, and is a substantial improvement over other programming techniques, there are difficulties which arise. These difficulties are caused by the fact that it is easy for developers to reuse their own objects, but it is difficult for the developers to use objects generated by other programs. Further, frameworks generally consist of one or more object "layers" on top of a monolithic operating system and even with the flexibility of the object layer, it is still often necessary to directly interact with the underlying system by means of awkward procedure calls.

In the same way that a framework provides the developer with prefab functionality for a document, a system framework, such as that included in the preferred embodiment, can provide a prefab functionality for system level services which developers can modify or override to create customized solutions, thereby avoiding the awkward procedural calls necessary with the prior art frameworks. For example, consider a customizable network interface framework which can provide the foundation for browsing and accessing information over a computer network. A software developer who needed these capabilities would ordinarily have to write specific routines to provide them. To do this with a framework, the developer only needs to supply the characteristic and behavior of the finished output, while the framework provides the actual routines which perform the tasks.

A preferred embodiment takes the concept of frameworks and applies it throughout the entire system, including the document, component, component layer and the operating system. For the commercial or corporate developer, systems integrator, or OEM, this means all of the advantages that have been illustrated for a framework, such as MacApp, can be leveraged not only at the application level for things such as text and graphical user interfaces, but also at the system level for such services as printing, graphics, multi-media, file systems and, as described herein, network-specific operations.

Referring again to FIG. 7, the window object 730, the graphic interface object 750 and the primitive object 746 are elements of a graphical user interface of a network component system having a customizable framework for greatly enhancing the ability of a user to record a location of a resource coupled to a computer network in a notebook of the system. In the illustrative embodiment, the novel notebook is a compound document and the network location is recorded in the document as an item. The notebook and item are preferably represented by visual objects, e.g., icons, displayed on the graphical user interface for manipulation by a user to display their contents on a computer screen. That is, the notebook may be opened to display a list of its items and an item may be opened to display the contents of the referenced resource.

Figure 8:
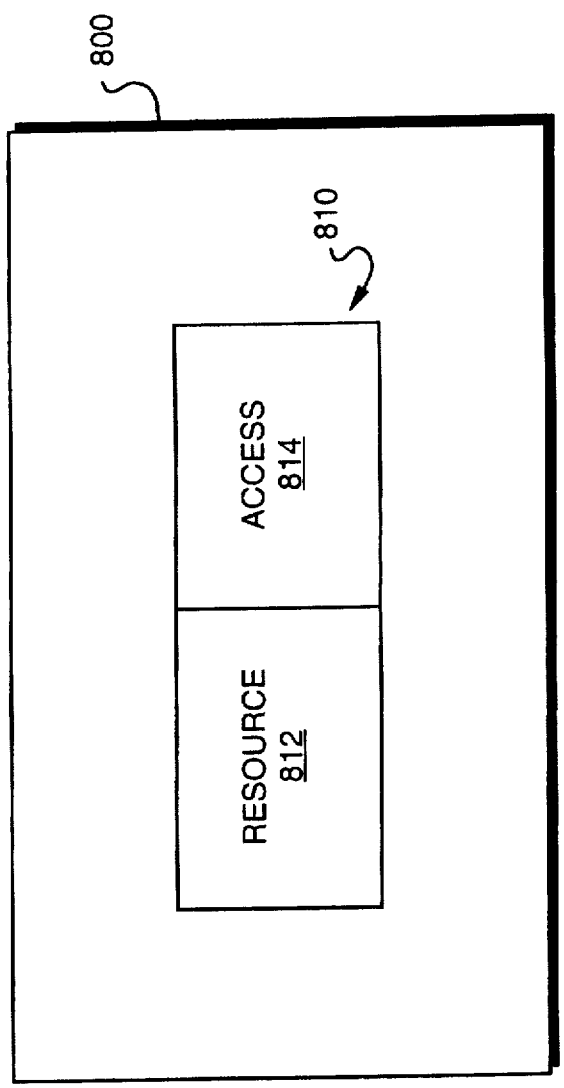
FIG. 8 is a schematic diagram showing an illustrative network item in accordance with the invention.

Each item preferably contains an address pointer, e.g., a uniform resource locator (URL), for referencing any resource resident on the computer networks. FIG. 8 is a schematic diagram showing an illustrative network item 800 containing an address pointer 810 to a resource location on the network. The address pointer may be stored as uniform resource locator (URL) having a first portion 812 that identifies the particular resource location and a second portion 814 that specifies the means for accessing that resource. In response to a user double-clicking on its associated icon, the item examines its URL and proceeds to "open" and display the resource as a document. An example of a network-oriented component system for creating a network entity that contains a reference to a resource resident on computer networks is provided in copending and commonly assigned U.S. patent application titled Encapsulated Network Entity Reference of a Network Component System, filed May 5, 1995, which application is incorporated by reference as though fully set forth herein.

The notebook and item are further implemented as components of the network-oriented component system that, according to the principles of the invention, are extensible and replaceable (in the case of the notebook) in accordance with a cooperating relationship between the system and the underlying software component architecture. Specifically, this cooperating relationship allows the novel notebook to be replaced, extended or modified by other notebook-type components, while allowing other service developers to insert their items into the notebook without affecting operation of the system. In addition, such a highly-modular cooperating layered-arrangement between the system and component architecture ensures that these components "seamlessly" interact with existing components and component editors of the system.

Moreover, the network components are preferably implemented as objects and communication among the network component objects is effected through novel application programming interfaces (APIs). These APIs are preferably delivered in the form of objects in a class hierarchy that is extensible so that developers can create new components and editors. From an implementation viewpoint, the objects can be subclassed and can inherit from base classes to build customized components that allowing users to see different kinds of data using different kinds of protocols, or to create components that function differently from existing components.

In accordance with the invention, the customized framework has a set of interconnected abstract classes for defining network-oriented navigation objects used to build the customized network components. These abstract classes include CyberItem, CyberStream and CyberExtension and the objects they define are used to build the novel network components. A description of these abstract classes is provided in copending and commonly assigned U.S. patent application titled Extensible, Replaceable Network Component System, filed May 5, 1995, which application is incorporated by reference as though fully set forth herein. Specifically, the CyberItem class defines the item object which interacts with objects defined by the other abstract classes of the network system to efficiently "transport" a user back to a desired network location in response to manipulation of the item object's icon.

Figure 9:
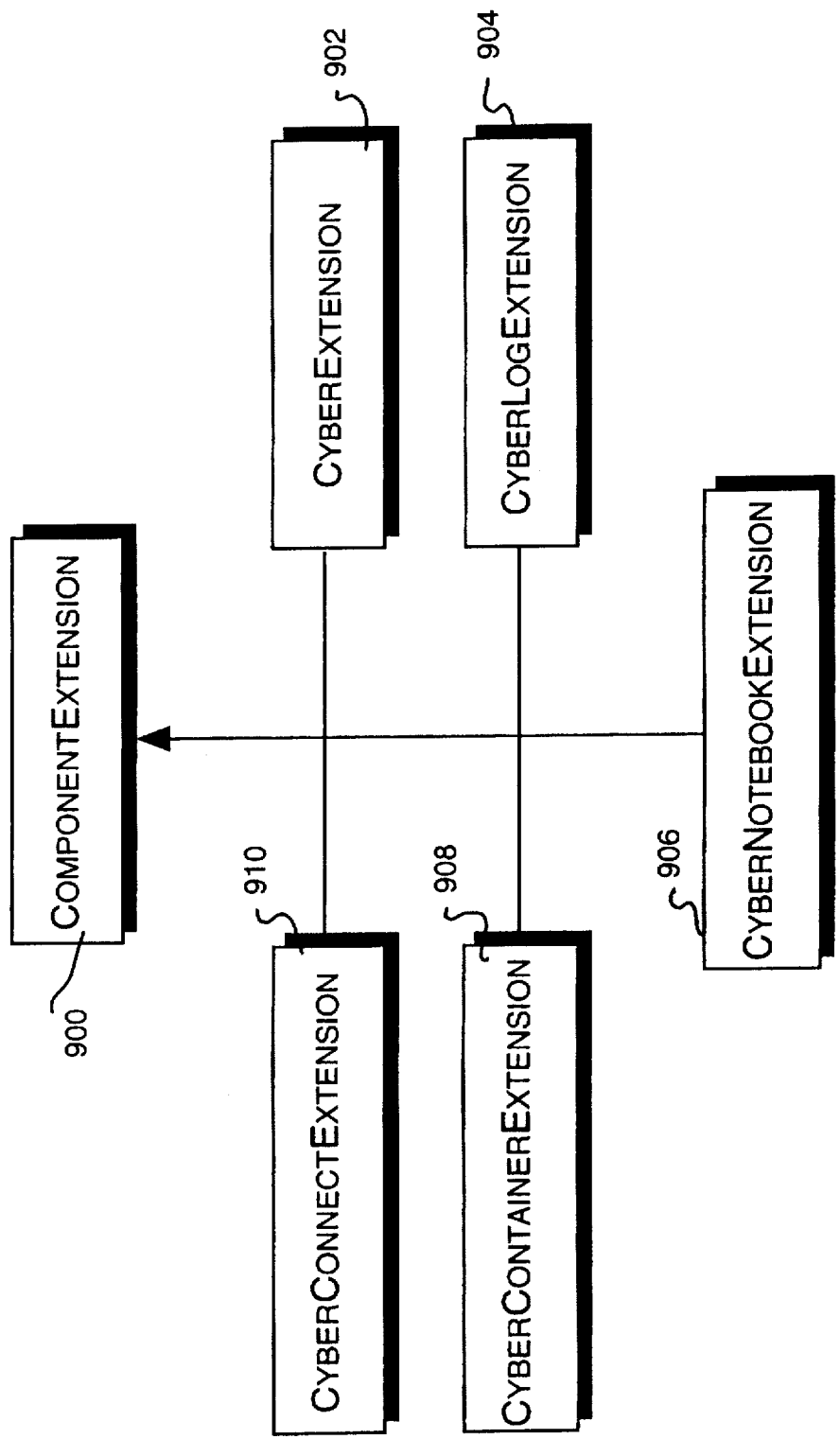
FIG. 9 illustrates a simplified class hierarchy diagram illustrating classes CyberExtension and CyberNotebookExtension used to construct a replaceable and extensible notebook component object in accordance with the invention.

FIG. 9 illustrates a simplified class hierarchy diagram of, inter alia, the classes CyberExtension 902 and CyberNotebookExtension 906 used to construct the notebook network component object 602. CyberExtension objects are the mechanisms for adding functionality to, and extending the APIs of, e.g., computing components so that they may communicate with the novel network components. Accordingly, the CyberExtension class 902 is a subclass of a ComponentExtension base class 900, which defines the generic behaviors of extensions to the computing components. The CyberNotebookExtension class 906 is also a subclass of the base class ComponentExtension 900 and the objects defined by this class are used to build components having the replaceable and extensible behaviors of the novel notebook.

Specifically, the CyberExtension class provides an API for accessing other network-type components, such as the notebooks, and for supporting graphical user interface elements, such as menus. CyberExtension objects are also used by components that display the contents of CyberItem objects. The CyberNotebookExtension class, on the other hand, provides an API for transposing any component into a notebook component. The methods associated with the CyberNotebook Extension class include (the arguments have been omitted for simplicity):

AddCyberItemToNotebook ( );
AddCyberItemsToNotebook ( );
ShowNotebookWindow ( );
IsNotebookWindowShown ( ).

In the illustrative embodiment of the invention, the notebook is utilized as a local storage repository on a client computer for users to store (as items) references to places "visited" on the network that are of particular interest. For example, a user may store, in the notebook, a reference to a specific document page on a Web server, or to a picture or text file on an FTP server. Thereafter, to quickly and efficiently return to the locations referenced by the items, the user merely double-clicks on any of the icons representing these stored items. It should be understood that only references to locations or network-based objects may be stored in the notebook; the actual document or file, such as an application or picture, are not typically stored in the notebook.

Figure 10:
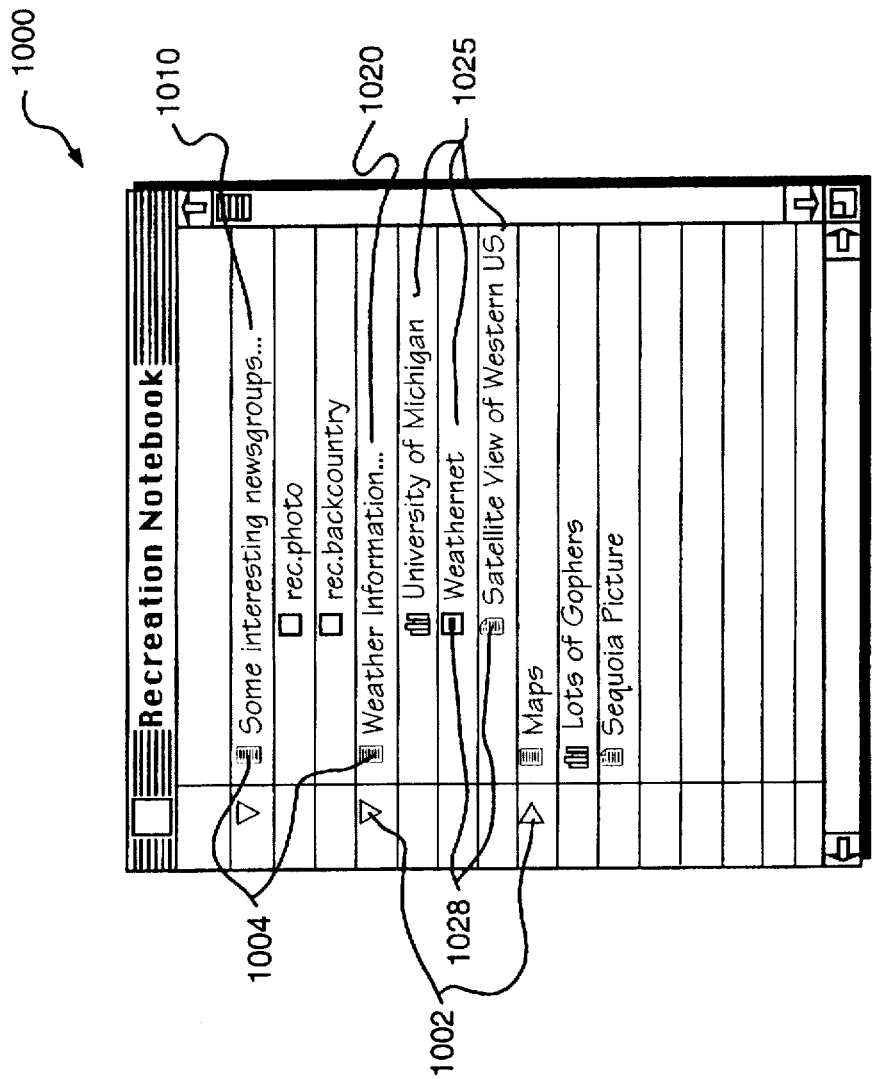
FIG. 10 is a schematic illustration of the contents of the replaceable and extensible notebook according to the invention.

FIG. 10 is a schematic illustration of the contents of the replaceable and extensible notebook component according to the invention. When the notebook 1000 is opened, a list of categories and network item objects are displayed on the screen 235 (FIG. 2) of a computer 200. Categories, such as Some interesting newsgroups 1010 and Weather information 1020 allow users to separate network item objects 1025 within a notebook component in a logical and useful way. In the illustrative embodiment, each category may be "folded" to display only the category name or "unfolded" to display the category members by clicking on the triangle controls 1002 positioned to the left of the category icons 1004.

Figure 11:
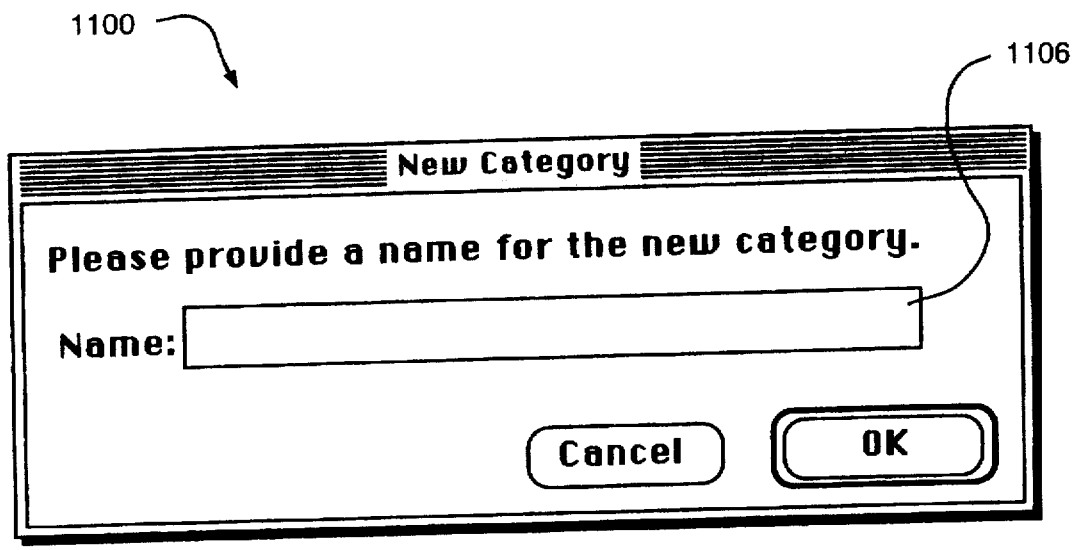
FIG. 11 is a schematic diagram of an illustrative dialog box used to create a category in e notebook component.

FIG. 11 is a schematic diagram of an illustrative dialog box 1100 used to create a category in the notebook component. Specifically, a user may create a new category in the notebook by, e.g., choosing a "Create New Category" entry from a Notebook menu (not shown) and filling in the desired name in a name field 1106 of the dialog. In addition, any category may be renamed by selecting the desired category from the notebook 1000, choosing a "Rename" entry from the Notebook menu and typing a desired name in a dialog box similar to the one shown in FIG. 11.

As noted, a user may interact with items in the notebook by directly manipulating them. That is, an item may be added to a notebook component by dragging it directly into a notebook window from any system component, such as a network browser, in accordance with the embedding procedure described herein (see description for FIGS. 6 and 7). Furthermore, and referring again to FIG. 10, an item 1025 may be placed into a category by dragging and dropping the item's icon 1028 on top of the category icon 1004.

Figure 12:
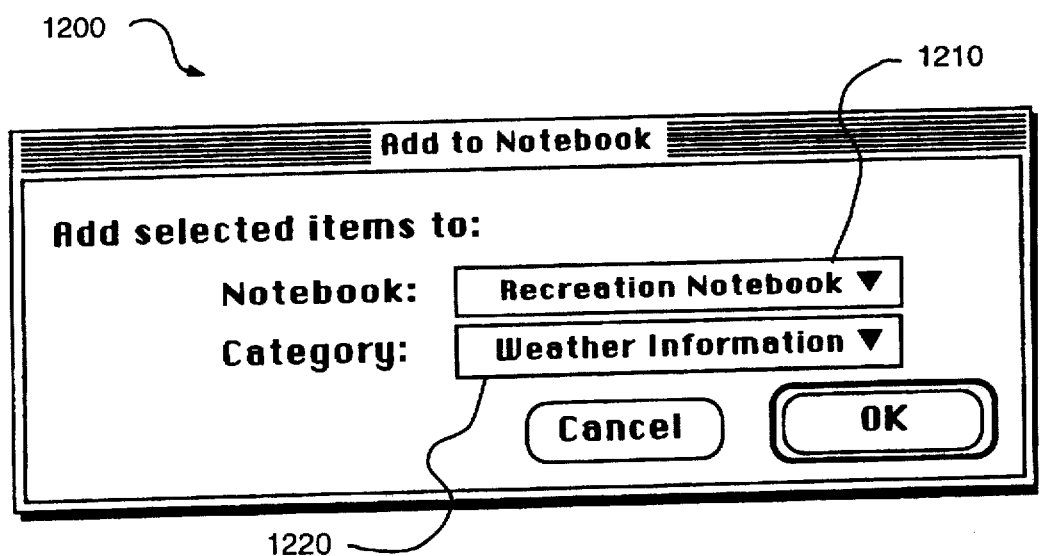
FIG. 12 is a schematic diagram of an illustrative modal dialog box used to specify a particular notebook and category for inserting the network item of FIG. 8 in accordance with the invention.

The user may also add items to the notebook using menu commands. If a network item object 1025 is selected, the user may choose an Add Selected Items to Notebook entry from the Services menu (not shown) to display a modal dialog box. FIG. 12 is a schematic diagram of an illustrative modal dialog box 1200 which allows the user to specify the particular notebook (Notebook field 1210) and the particular category the item should be place in (Category field 1220).

In summary, the inventive notebook described herein embodies a component approach to network navigation tools; any service having a corresponding component adapted to the network-oriented component system can utilize the notebook for recording network locations. Advantageously, the notebook component may be efficiently extended, replaced and modified within the network component system. Although monolithic application programs such as Netscape and TurboGopher have functional equivalents to the novel notebook, i.e., tools for recording locations of network resources, each of these applications' notebook is solely their own and, thus, cannot be replaced, extended or modified.

While there has been shown and described an illustrative embodiment for implementing an extensible and replaceable network component system, it is to be understood that various other adaptations and modifications may be made within the spirit and scope of the invention. For example, additional system software routines may be used when implementing the invention in various applications. These additional system routines include dynamic link libraries (DLL), which are program files containing collections of window environment and networking functions designed to perform specific classes of operations. These functions are invoked as needed by the software component layer to perform the desired operations. Specifically, DLLs, which are generally well-known, may be used to interact with the component layer and window manager to provide network-specific components and functions.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. An extensible and replaceable network-oriented component system for recording locations of resources coupled to computer networks, the system residing on a computer including a component architecture layer interfacing with an operating system to control the operations of the computer, the system comprising:

a network component layer coupled to the component architecture layer in cooperating relation; and a notebook component defined by the network component layer for recording a reference to a resource coupled to the computer networks, the notebook component being replaceable and extensible by other notebook-type components in response to the cooperating relationship between the network component layer and the component architecture layer, wherein said component architecture layer and said network component layer cooperate via an application programming interface to embed components within one another to form a compound document including mixed data types and formats.

2. The system of claim 1 wherein the reference to the resource coupled to the computer networks is recorded in the notebook component as an item component.

3. The system of claim 2 wherein the notebook component is a compound document stored on the computer.

4. The system of claim 2 wherein the notebook and item components are represented by visual objects for manipulation on a computer screen.

5. The system of claim 4 wherein the visual objects are icons, and wherein the notebook icon may be opened to display the item icon on the screen and the item icon may be opened to display the contents of its referenced resource.

6. The system of claim 2 wherein the notebook and item components are objects and wherein the network component layer comprises application programming interfaces delivered in the form of objects in a class hierarchy.

7. The system of claim 6 wherein the application programming interfaces include an item class for constructing the item object as a network navigation object representing a network resource available at any location on the computer networks.

8. The system of claim 7 wherein the application programming interfaces further include an extension class for constructing a network navigation object representing additional behaviors provided to computing components of the component architecture layer to thereby enable communication between the computing components and the network navigation components.

9. The system of claim 8 wherein the application programming interfaces further include a notebook extension class for further constructing the notebook object as a network navigation object representing the behaviors of a notebook component.

10. An extensible and replaceable network-oriented component system for providing services directed to resources coupled computer networks, the system comprising:

a processor;

an operating system;

a component architecture layer interfacing with the operating system to control the operations of the processor;

a network component layer coupled to the component architecture layer in cooperating relation; and a notebook component defined by the network component layer for recording a reference to a resource coupled to the computer networks, the notebook component being replaceable and extensible by other notebook-type components in response to the cooperating relationship between the network component layer and the component architecture layer, wherein said component architecture layer and said network component layer cooperate via an application programming interface to embed components within one another to form a compound document including mixed data types and formats.

11. The system of claim 10 wherein the component architecture layer defines a plurality of computing components, and wherein the component architecture layer and the network component layer comprise means for embedding the computing components within one another to form a compound document having mixed data types and formats.

12. The system of claim 11 wherein the reference to the resource is recorded in the notebook component as an item component and wherein the notebook component is a compound document.

13. The system of claim 12 wherein the item component comprises an address pointer that identifies a location of the resource on the computer networks.

14. The system of claim 13 wherein the notebook component is a repository for storing item components representing particular locations on the computer networks.

15. The system of claim 11 wherein the network component layer further comprises an application programming interface for transposing the computing components to the notebook component.

16. A method for recording locations of selected network resources of interest to a user of a computer system coupled to computer networks, the method comprising the steps of:

controlling operations of the computer system with an operating system coupled to a component architecture layer of the system;

integrating a network component layer of the computer system with the component architecture layer to provide a cooperating component computing arrangement;

creating a notebook component using the cooperating component computing arrangement, the notebook component comprising a repository for recording items comprising references to network resources connected to the computer networks, the items represented by item icons displayed on a notebook window of a screen of the computer system, wherein said component architecture layer and said network component layer cooperate via an application programming interface to embed components within one another to form a compound document including mixed data types and formats; and inserting references to selected network resources into the notebook component by dragging and dropping selected item icons onto the notebook window.

17. The method of claim 16 further comprising the steps of:

opening the notebook component to display a list of categories for organizing the selected items, the categories represented by category icons displayed on the screen; and one of folding each category icon to display a category name; and unfolding each category icon to display selected items of each category.

18. The method of claim 17 wherein the steps of folding and unfolding comprise the step of clicking on a triangle control positioned adjacent to the category icons using a mouse of the computer system.

19. The method of claim 17 further comprising the step of adding a specific item to a specific category by dragging and dropping the item icon of the specific item onto the category icon of the specific category.

20. The method of claim 16 wherein the cooperating component computing arrangement allows one of replacing, modifying and extending the notebook component with a different notebook-type component to provide the user with a customized network service offering.

* * * * *